Nov. 3, 1931.  E. J. SERPAS  1,830,374
AUTOMATIC LUBRICATING DEVICE
Filed Dec. 18, 1928  4 Sheets-Sheet 1
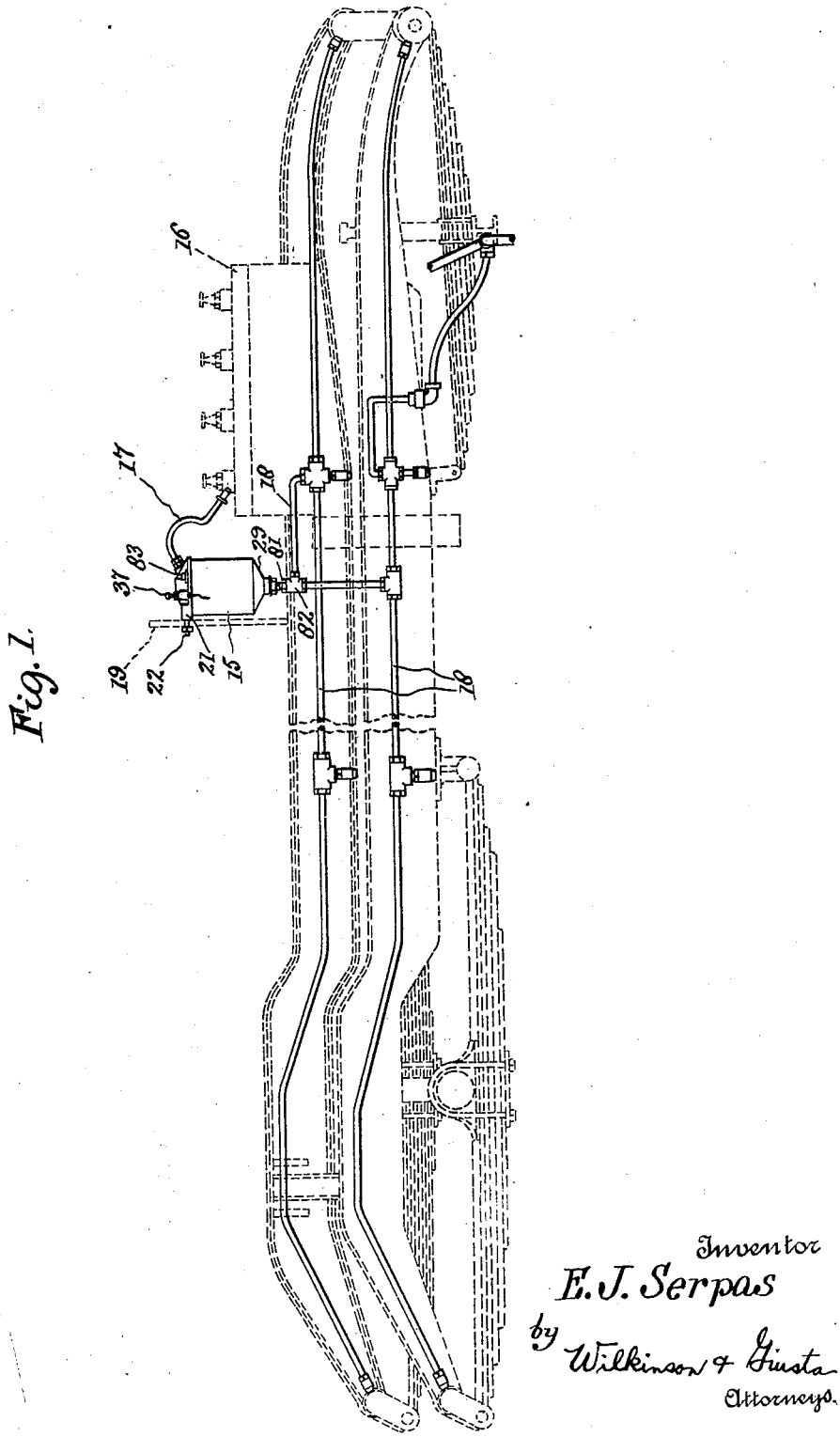
Inventor
E. J. Serpas
by Wilkinson & Giusta
Attorneys.

Nov. 3, 1931.                E. J. SERPAS                1,830,374
                      AUTOMATIC LUBRICATING DEVICE
                      Filed Dec. 18, 1928        4 Sheets-Sheet 2

Inventor
E. J. Serpas
by Wilkinson & Giusta
Attorneys.

Nov. 3, 1931.    E. J. SERPAS    1,830,374
AUTOMATIC LUBRICATING DEVICE
Filed Dec. 18, 1928    4 Sheets-Sheet 4
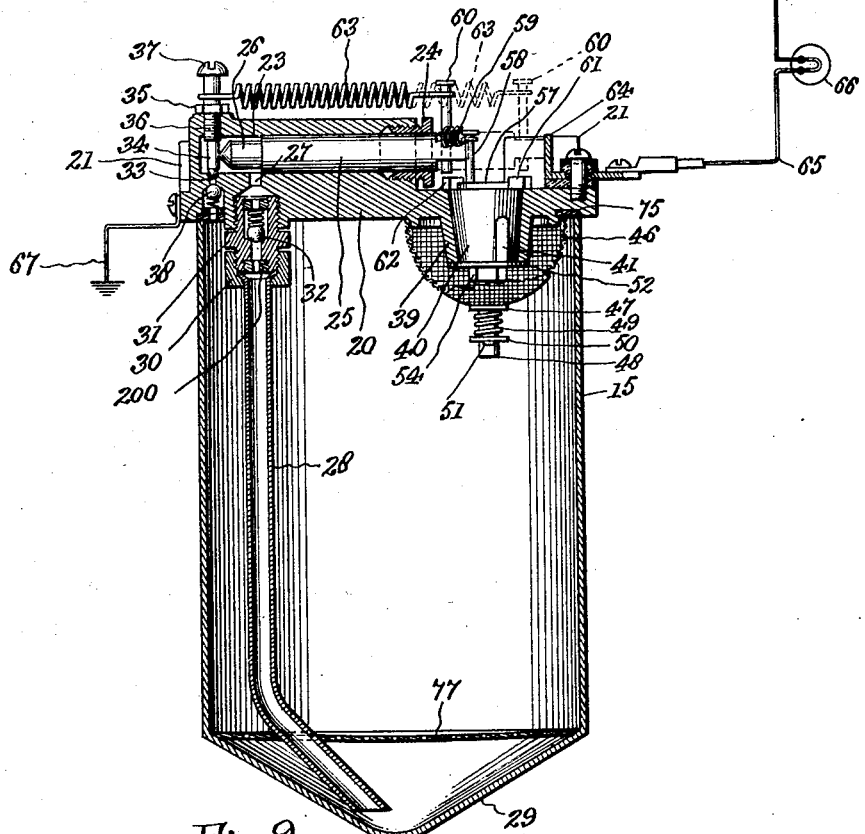
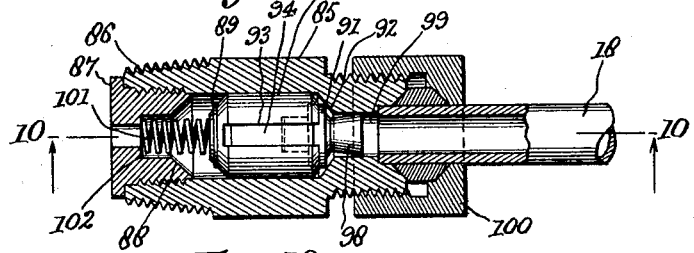
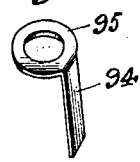
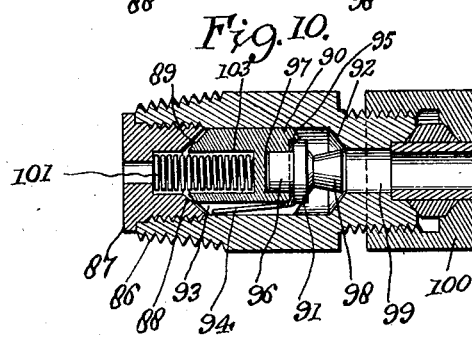

Patented Nov. 3, 1931

1,830,374

UNITED STATES PATENT OFFICE

ERNEST J. SERPAS, OF NEW ORLEANS, LOUISIANA

AUTOMATIC LUBRICATING DEVICE

Application filed December 18, 1928. Serial No. 326,889.

The present invention relates to improvements in automatic lubricating devices and relates to certain improvements over my prior U. S. Patent No. 1,677,992, granted July 24, 1924, and reissued August 28, 1928, No. 17,073.

Whereas the device according to the aforesaid patent derived its propulsion force for driving the lubricant to the bearing from the vibration of the vehicle incident to road travel, an object of the present invention is to utilize the energy from the internal combustion or from a steam engine, compressed air engine or any source of elastic pressure medium, whereby the lubricant will be subjected to pressure and forced through one or more pipes to a bearing or bearings on a vehicle to be lubricated.

It is the aim of the present invention to provide for the adequate and faithful lubrication of all the shackle bolts and other bearing parts of the vehicle, while the same is in motion and in operation and at frequent intervals in an automatic manner that will avoid the bearings running dry and becoming unduly worn and noisy for this reason.

It is another object of the invention to provide a simply constructed and positively acting device for delivering measured quantities of the lubricant periodically to the lubricating system.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a diagrammatic view showing the chassis of an automobile with the improved lubricating device mounted thereon.

Figure 2 is a top plan view of the lubricating device with parts broken away.

Figure 3 is a side elevation of the same with parts broken away and parts shown in section.

Figure 4 is a vertical central section taken on the line 4—4 in Figure 2.

Figure 8 is a vertical section taken on the line 8—8 in Figure 2.

Figure 9 is a longitudinal section taken through one of the discharge nozzles showing the valve in one position.

Figure 10 is a longitudinal section taken on the line 10—10 in Figure 9 with the valve shown in a subsequent position, and Figure 11 is a perspective view of the by-pass spring employed.

Figure 5:
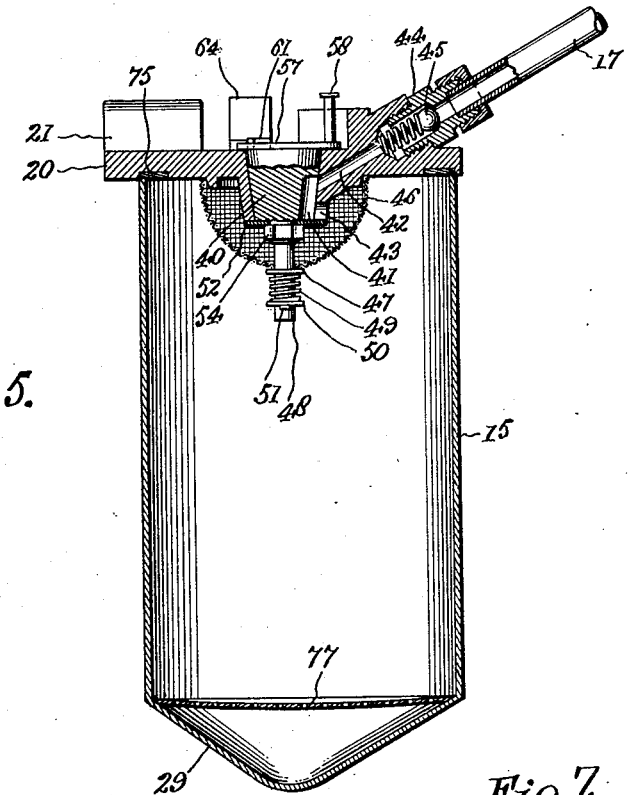
Figure 5 is also a vertical section taken on the line 5—5 in Figure 2.

Referring more particularly to the drawings 15, in Figure 1, designates a tank or container for the grease, oil or other lubricant, which is in communication with one cylinder of the internal combustion engine 16 through a pipe 17, whereby an internal pressure is developed in the tank 15 for forcing the lubricant through the pipe system 18 to the various shackle bolts, pins, bearings and other parts to be lubricated. The dash board of the automobile is represented at 19 and the container 15 may be affixed to this dash board or to any other appropriate part.

The tank or container is thus supported on the automobile or like machine at a point where it will be covered beneath the hood of the vehicle. The container 15 is closed at its upper end by a head 20 having cast thereon or otherwise secured thereto, lugs 21 having threaded sockets to receive the bolts 22, shown in Figure 1, whereby the entire assembly is secured to the dash board 19 or other part. Cast, or otherwise formed, in the head 20, is a ram casing 23 having one end closed and the other end provided with the packing nut or gland 24 perforated for the sliding therethrough of the reciprocating plunger or ram 25 having the reduced end or extension 26 for overlapping, in the inner position of the ram 25 the inlet port 27 in the ram casing.

The ram is intended to be operated by the oil, driven by pressure, from the tank 15 through a tube 28, which lies within the casing 15 and has its open lower receiving end exposed within the inverted conical portion 29 of the lubricant casing. The tube 28 is coupled by a nut 30 to a check valve casing 31 having therein the ball or other spring-pressed check valve 32 closing downwardly and opening upwardly to let the lubricant into the ram casing 23 when a predetermined pressure limit is exceeded, for which pressure limit the valve 32 is loaded. Near the closed end of the ram casing is a restricted aperture 33 for permitting the flow of oil or lubricant from the ram casing back into the container 15. This port 33 is under the control of a needle valve 34 adjustably mounted through the top of the ram casing and being exposed for manipulation at the top of the device. A lock nut 35 may be employed to hold the needle valve in the adjusted position, the needle valve preferably having threads 36 which afford a micrometer adjustment and having a slotted or other head 37 on the exterior to receive a screw driver, or other tool, or the hand of the operator for rotating the same to control the port area at 33 so as to act as a relief valve for permitting of the movement of the oil from the ram cylinder 23 back into the container 15. Controlling the port 33 is an upwardly seated spring-pressed check valve 38 adapted to be closed by the aid of its spring and by the pressure existing within the tank 15 above the body of lubricant, whereby this pressure is prevented from spreading from the tank 15 into the ram cylinder 23.

In the head member 20 is provided a tapered valve cage 39 for receiving a complementally formed plug valve 40 having a valve port 41 therein. As shown in Figure 5 this port 41, in one position of the valve 40 is adapted to set up communication between the ports 42 and 43. The port 42 communicates with the pipe 17 which extends from the internal combustion motor. Where this pipe 17 is coupled to the head 20 a check valve casing 44 is provided containing the upwardly closing spring-pressed check valve 45. This check valve 45 opens on predetermined pressure in the pipe 17, but prevents the backward escape into the pipe 17 of the pressure in the container 15. A semi-globular mesh strainer 46 lies within the container and against the lower surface of the head 20, being held in place by the washer 47 which extends about the bolt or stem 48 extending down from the plug valve 40. The washer 47 is yieldably pressed upon by the coil spring 49, which is confined at its opposite or lower end by the washer 50; both washers and the spring being held removably upon the stem 48 by a cotter key 51 or other appropriate device.

A disc washer 52 extends beneath the plug valve 40 and beneath the cage 39 and is perforated to receive the threaded portion 53 of the stem 48. This threaded portion 53 is adapted to removably receive a nut 54 whereby the washer is held in place and the conical plug valve 40 drawn down tightly within the conical cage 39.

Figure 6:
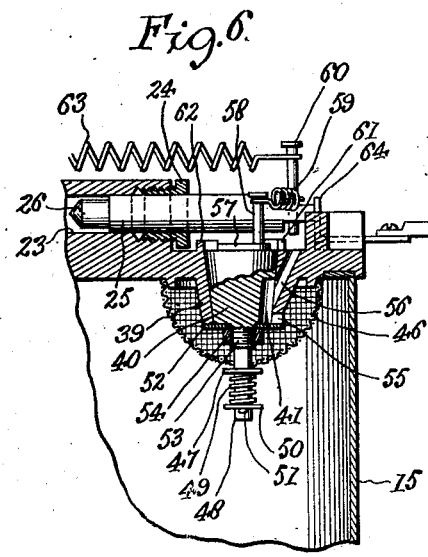
Figure 6 is a fragmentary vertical section taken on the line 6—6 in Figure 2 with the plunger forced out and the valve placing the container in communication with the atmosphere.
Figure 7:
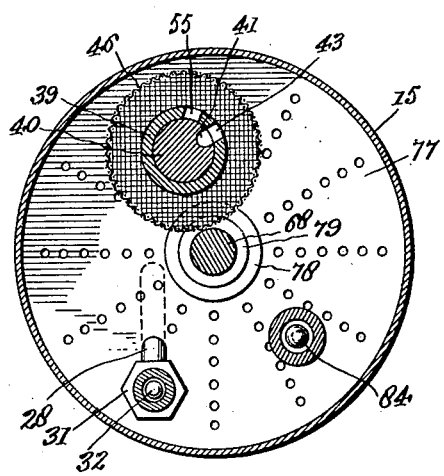
Figure 7 is a horizontal section taken on the line 7—7 in Figure 3.

As shown in Figure 6, where the plug valve 40 has been rotated to a different angular position from that shown in Figure 5, the valve port 41 is shown as registering with the port 55 and with a vent port 56, whereby the pressure within the casing 15 may be reduced. The plug valve 40 carries at its upper end an arm 57 diametrically extending across and beyond the valve body and having an upstanding pin 58 to which is secured at one end a coil spring 59. The other end of such spring is secured to a pin 60 on the projected end of the ram plunger 25. The opposite end of the arm 57 also projects beyond the top of the valve 40 where it is in position to strike the oppositely disposed stops 61 and 62. A spring 63 is coupled to the pin 60 and to the needle valve 37.

In Figure 6 the ram plunger is shown in the extended position as engaging against a contact post 64 which is insulated from the head 20 and coupled to a lead wire 65 extending to a suitable source of electromotive force, such for instance as the battery circuit of the automobile. In this conductor 65 is included a signal lamp 66. The circuit is grounded through the lead 67 at the opposite side of the container, as shown in Figure 8. The post 64 answers two purposes, first as an abutment to prevent the ram piston 25 from being forced completely out of the ram casing by the oil pressure; and secondly, to make a contact which completes an electrical circuit from the positive terminal 65, through the lamp 66, post 64, the ram and finally to ground or negative 67.

As shown in Figure 4, the container 15 is securely held to the head casting 20 by means of a central bolt 68 lying longitudinally within the tank. The bolt is threaded at its lower end internally into a bushing 69 being hollow within for the passage of oil and internally threaded as at 70 and 71. The bushing 69 is provided with the shoulder or flange 72 for clamping the gasket 73 against the lower projecting neck 74 of the container, whereby to hold the tank between the flange 72 and the head casting 20. A gasket 75 may be interposed between the head casting and the upper rim of the container 15 to avoid leakage. A perforation 76 is made in the side wall of the hollow bushing 69 to set up communication between a chamber within the lower conical portion 29 of the container and the interior of said bushing 69. A strainer 77, consisting of a perforated disc or a strainer of other form has its peripheral edge engaging with the wider portion of the conical bottom of the container. This strainer is perforated to extend about the lower threaded and reduced end of the bolt 68. A gasket 78 and a washer 79 are interposed between the strainer disc 77 and a shoulder 80 on the bolt 68. Connected and communicating with the interior of the bushing 69 as its lower end is a pipe nipple 81, which in turn communicates with a T-coupling 82 which connects with the system of pipes 18 extending to the various destinations for the lubricant.

In the head casting 20 is a filling cap 83, whereby lubricant may be supplied to the container 15. In the cap is a relief valve 84. At the free ends of the branch tubes or pipes 18 are metering valve devices secured to the parts to be lubricated. Each valve devices includes a casing 85 having threads 86 by which the device may be secured to the part to be lubricated. In this end of the casing is a threaded hollow plug 87 out through which the lubricant is forced. This plug is provided with a conical valve seat 88 adapted to receive thereagainst the valve member 89 carried by the valve plunger 90. This valve plunger is provided with an opposed valve member 91 adapted to close against a conical valve seat 92 in the other end of the casing 85. The valve plunger 90 is of less length than the chamber within the casing 85 between the valve seats 88 and 92, whereby the plunger 90 may have a reciprocating movement in such chamber. The valve plunger 90 is formed with a longitudinal groove or passage 93 extending from end to end and receiving therein a leaf spring 94 shown more particularly in Figure 11. This spring is provided with an annular head 95 bent at approximately right angles to the leaf 94. The annular head 95 is adapted to surround the neck portion 96 of a plug which is adapted to fit into a recess 97 made in one end of the valve plunger 90. This neck 96 is provided with a flange 91, which forms the valve member hereinbefore referred to and this flange is adapted to bind the annular part 95 against the end of the valve plunger 90.

The flange 91 carries an extension plug or head 98 preferably having a diameter at its free end substantially equal to the internal diameter of the passage 99 into which the plug 98 is movable, as shown in Figure 9. The plug 98 is preferably of a conic section with its smaller end adjoining the flange 91. The conduit 18 is connected to the passage 99 in any appropriate way as by the use of a nut union 100. A coil spring 101 is seated at one end in a recess 102 in the plug 87 and at its inner end in a recess 103 in the adjoining end of the plunger valve 90.

In operation, it is assumed that the container 15 is filled up to a suitable level with oil or other lubricant which is introduced by first removing the filling cap 83. The filling cap is afterwards replaced. It is preferred not to fill the container up to too high a level, but to provide a substantial headway above the liquid column for receiving gas under pressure. In the instance shown this pressure medium is received through the pipe 17 from the internal combustion engine 16, such pipe 17 communicating with one or more or the compression chambers of the engine. During the operation of the engine a portion of the explosion pressure will be forced into the tube 17, past the check valve 45, through the ports 42, 41 and 43, as shown in Figure 5, and through the strainer 46 into the head space of the container 15 above the body of lubricant.

After the motor has pumped a sufficient pressure into the tank 15, the lubricant will be forced out through aperture 76, shown in Figure 4, and out through the interior of the bushing 69, nipple 81, T-coupling 82 and thence to the conduits 18, which carry the lubricant under pressure to the valve devices, shown in Figures 9 and 10. The lubricant entering the valve casings 85, will act initially to force the valve plunger 90 to the outer position, shown in Figure 10, where such valve plunger will close the seats at 89. The valve plunger 90 will be held in this position until the pressure in the tank 15 is relieved. The space in the casings 85 behind the valve plungers 90 is thus filled with lubricant which escapes through the passage 99 about the larger end of the plug 98, which as shown in Figure 10 has been withdrawn a short distance from the passage 99. While the various valve plungers 90 are being moved outwardly by the pressure of oil, as just referred to, the lubricant under pressure within the tank 15, entering the ram casing 23 through the pipe 28, breaks down the resistance of the spring 63, which tends to resist the outward movement of the ram 25. Of course the oil opens the check valve 32 and this check valve will close to prevent the return of the oil to the tank 15. As long as the pressure is maintained in the tank 15, the oil will spread into the ram casing 23 gradually forcing the ram 25 outwardly until it reaches the extremity of its outward travel and abuts against the electrified post 64, whereupon the circuit hereinbefore referred to through the conductors 65 and 67 is closed illuminating the indicating lamp 66.

When the ram has moved to the extremity of its travel, as indicated by full lines in Figure 6, and by dotted lines in Figure 8, the spring 59 will pull upon the lever 57, rocking the lever and with it the valve 40 from the position, shown in Figure 5, to that shown in Figure 6, thereby cutting off the source of force supply from the tank 15 and placing the tank 15 in communication with the atmosphere through the ports 55, 41 and 56. The pressure in the tank 15 is immediately relieved and consequently the pressure all through the conduit system 18 drops, enabling the springs 101 to return the valve plungers 90 to the inner position, shown in Figure 9. The initial return movement finds the plugs 98 promptly entering the passages 99 to trap the measured quantity of the lubricant in the chamber in the casing 85, whereby to prevent this lubricant from returning through the passage 99 and compelling the lubricant to by-pass about the plunger valve 90, the leaf spring 94 being depressed automatically by the force of the oil pressure. Thus as the plunger valve 90 moves toward the right as viewed in Figures 9 and 10, the lubricant is transferred from the right hand sides of the plungers to the left hand side or to the discharge side of same. Any backward pressure of the lubricant through the groove or by-pass 93 is prevented by the leaf spring 94 expanding out against the wall of the chamber 85. Thus when the plungers 90 are subsequently again driven out after the tank 15 has been subjected to pressure a second time, the lubricant in the outer portions of the casings 85 is driven by the valve plungers 90 out through the plugs 87 and into the bearings or other destination for the lubricant.

In the position shown in Figure 9, the valve portions 91 are in line contact with the valve seats 92, sealing the system at all points of distribution and preventing any further passing of lubricant.

If the needle valve 34 were closed upon the port 33 preventing the escape of pressure within the ram casing 23, the ram 25 would be held in the outer position against stop 64, where it has been moved as previously described. This would maintain the circuit closed and the lamp illuminated showing to the operator that the system was closed and inactive. However, if the needle valve 34 is opened, then the built-up pressure within the ram casing 23 may flow back through the restricted port 33 into the casing 15. The accumulated pressure in the ram casing 23 may be itself initially sufficient to open the check valve 38, but the spring 63 will draw the plunger 25 gradually back to initial position and will force the lubricant before it out through the restricted port 33, past the downwardly opening check valve 38 and back into the tank 15. It will be noted that the port 33 is restricted and hence although the needle valve 34 is left permanently open, nevertheless the pressure pumped from the tank 15 into the ram casing 23 will enter the ram casing faster than it can escape back into the tank 15 through the restricted return port 33, and hence a pressure will be built up in the ram casing 23 to force the ram 25 outwardly in accordance with the procedure of action above outlined.

Now the needle valve 34 may be nicely adjusted with reference to the restricted port 33 so as to time the return of the ram 25 back to the initial position, shown in Figure 8. If the port area at 33 is very small, the plunger 25 will return very slowly and hence the intervals between which measured quantities of the lubricant are administered to the bearings will be remote in point of time. On the other hand if the needle valve 34 is opened wide; then the periods of applying lubricant will be more frequent. When the plunger returns to the initial position, shown in Figure 8, it pulls upon the spring 59, which in turn rotates the plug valve 40 back to the initial position, shown in Figures 2 and 5, where a re-establishment of the communication between the tank 15 and internal combustion engine is had and the building up of a pressure in the tank 15 is begun again. The re-establishment of the pressure in the tank 15, acts through the conduit system 18 to force all of the plunger valves 90 again to the outer position, thus forcing the lubricant before these valve plungers out through the plugs 87 and into the bearings to be lubricated.

A calibrated bushing 200 may be placed in the nipple 31 for restricting the flow of the lubricant from the tank 15 to the ram casing 26. In this way the time interval for building up sufficient pressure in the ram casing to drive the ram to the outermost position may be regulated by selecting a bushing with an opening of greater or less diameter; and consequently regulating the time in which the pressure is permitted to exert upon the lubricant in the system.

In order to prevent the oil from passing through the conduits 18 and out around the by-passes 93 of the valve plungers 90, the plugs 98 prevent access of the lubricant under pressure in the conduit system 18 to the by-pass passages 93, the lubricant under pressure in the conduit system 18 being initially against only the ends of the plugs 98. This condition continues until the valve plungers 90 are almost at the outer limits of their movement. During all of this outer movement, a partial vacuum is being formed in the inner portions of the chambers within the casings 85 and about the plugs 98. The void instantly and energetically draws a measured quantity of lubricant from the passage 99 into the chambers just referred to, as soon as the plugs 98 move out of the passages 99. The valve plungers 90 may pause in their outer movements, while the lubricant is filling the chambers surrounding the stems or plugs 98. Subsequently the pressure is applied to the whole rear face of the plungers 90 forcing the plungers outwardly to close the valve seats at 89. It will be understood that the leaf springs 94 possess a degree of resistance to the passage of the oil outwardly or toward the plugs 87 and this will prevent the continuous flow of oil outwardly through the devices.

The valve stems or plugs 98 may be varied as to length with the result that the shorter the stems the less oil will be measured out and delivered by the devices.

The pressure of the system may be regulated by the spring pressure of the spring in the filling cap 83, shown in Figure 3.

While I have shown and described the invention as associated with a motor vehicle and its internal combustion engine, it will be apparent that the device may be operated by other sources of pressure than that supplied from the combustion chambers of internal combustion motors, such as air or steam pressure and the device may be used on stationary engines or other machines needing lubrication.

It is obvious that various changes and modifications may be made in the details of construction and design of the above specifically described embodiment of this invention without departing from the spirit thereof, such changes and modifications being restricted only by the scope of the following claims.

What is claimed is:—

1. In an automatic lubricating apparatus, a container for lubricant in controlled communication with a source of gas under pressure and with the atmosphere, a lubricant conduit leading from said tank to the parts to be lubricated, a valve movable to alternately open and close the communication of the tank with the pressure source and with the atmosphere, a ram chamber in controlled communication with the interior of the container, a ram in said ram chamber coupled to actuate said valve, and means for controlling the flow from the ram chamber back to the container.

2. In an automatic lubricating apparatus, a container for lubricant, a valve movable to two positions in one of which the container is in communication with a source of gas under pressure and in the second position of the valve the container is in communication with the atmosphere, a lubricant conduit from the container to the parts to be lubricated, a ram cylinder, a restricted inlet from the container to the ram cylinder, an outlet from the ram cylinder to the container, means for controlling said outlet, and a ram in the ram cylinder coupled to move said valve.

3. In an automatic lubricating apparatus, a container for lubricant having an inlet port in communication with a source of gas under pressure and having an outlet vent to the atmosphere, a valve having a port movable from the inlet port to the vent, stop means for restricting the movement of the valve in opposite directions, a ram in communication with the tank and adapted to be driven outwardly by the pressure within the tank, means for restoring the ram in the opposite direction, and a yieldable connection between said ram and the valve.

4. In an automatic lubricating apparatus, a tank in communication with the bearings to be lubricated and having spaced ports in communication with a source of gas under pressure and the atmosphere respectively, a valve having a port movable from one to the other of the first mentioned ports, stop means for arresting the valve in the two positions, a ram communicating with the container and adapted to be driven outwardly by the pressure within the container, yieldable means for returning the ram in the opposite direction, and a spring connection between said ram and the valve.

ERNEST J. SERPAS.